(12) United States Patent
Gu et al.

(10) Patent No.: US 9,847,197 B2
(45) Date of Patent: Dec. 19, 2017

(54) PROTECTION MODULE FOR CONTROL AND PROTECTIVE SWITCHING DEVICE

(71) Applicants: SEARI ELECTRIC TECHNOLOGY CO., LTD., Shanghai (CN); ZHEJIANG CHINT ELECTRICS CO., LTD., Zhejiang Province (CN)

(72) Inventors: Changxun Gu, Shanghai (CN); Di Zhang, Shanghai (CN); Huiyu Ji, Shanghai (CN); Ping Zeng, Shanghai (CN); Feng Jia, Shanghai (CN); Hong Xi, Shanghai (CN)

(73) Assignees: SEARI ELECTRIC TECHNOLOGY CO., LTD., Shanghai (CN); ZHEJIANG CHINT ELECTRICS CO., LTD., Yueqing (CN)

( * ) Notice: Subject to any disclaimer, the term of this patent is extended or adjusted under 35 U.S.C. 154(b) by 478 days.

(21) Appl. No.: 14/413,324

(22) PCT Filed: Jul. 10, 2013

(86) PCT No.: PCT/CN2013/079120
§ 371 (c)(1),
(2) Date: Jan. 7, 2015

(87) PCT Pub. No.: WO2014/008857
PCT Pub. Date: Jan. 16, 2014

(65) Prior Publication Data
US 2015/0138685 A1 May 21, 2015

(30) Foreign Application Priority Data
Jul. 12, 2012 (CN) .......................... 2012 1 0241583

(51) Int. Cl.
*H01H 73/20* (2006.01)
*H01H 47/32* (2006.01)
(Continued)

(52) U.S. Cl.
CPC .............. *H01H 47/32* (2013.01); *H02H 1/06* (2013.01); *H02H 7/22* (2013.01)

(58) Field of Classification Search
USPC ........................................................ 361/115
See application file for complete search history.

(56) References Cited

U.S. PATENT DOCUMENTS 5,754,386 A * 5/1998 Barbour ................. H02H 3/247
361/154
8,587,149 B2 * 11/2013 Caiti ........................ H02H 1/06
307/64
(Continued)

FOREIGN PATENT DOCUMENTS

CN 1301031 A 6/2001
CN 1303113 A 7/2001
(Continued)

OTHER PUBLICATIONS

Office Action dated Aug. 31, 2015, by the State Intellectual Property Office of the People's Republic of China in related Chinese Patent Application No. CN-201210241583.8 (6 pages).
(Continued)

*Primary Examiner* — Ronald W Leja
(74) *Attorney, Agent, or Firm* — Osha Liang LLP

(57) ABSTRACT

The present invention discloses a protection module for a control and protective switching device, comprising a control power supply processing unit, an auxiliary power supply processing unit, a power supply converting unit, a signal processing and controlling unit, a trip electromagnet driving unit, a control electromagnet driving unit, and a man-machine interaction device. The control power supply processing unit and the auxiliary power supply processing unit receive a power supply signal from a high voltage power supply, and process the signal for supplying power for other components. The signal processing and controlling unit
(Continued)

receives a mutual-induction signal from a current mutual inductor, outputs a first control signal and a second control signal to the trip electromagnet driving unit and the control electromagnet driving unit, and receives a first feedback signal and a second feedback signal from an operation mechanism and a control electromagnet. The trip electromagnet driving unit outputs a first operation signal to a trip electromagnet, and the trip electromagnet outputs a mechanical signal to the operation mechanism. The control electromagnet driving unit outputs a second operation signal to the control electromagnet. The man-machine interaction device performs signal interaction with the signal processing and controlling unit.

10 Claims, 1 Drawing Sheet

(51) Int. Cl.
*H02H 7/22* (2006.01)
*H02H 1/06* (2006.01)

(56) References Cited

U.S. PATENT DOCUMENTS

| | | | |
|---|---|---|---|
| 2003/0030954 A1* | 2/2003 | Bax | H01H 83/226 361/87 |
| 2003/0179528 A1 | 9/2003 | Fletcher et al. | |
| 2004/0257741 A1 | 12/2004 | Cuny et al. | |
| 2006/0212137 A1* | 9/2006 | Sone | G06F 1/263 700/22 |
| 2011/0102958 A1* | 5/2011 | Meehleder | H02H 1/06 361/93.1 |
| 2011/0187199 A1* | 8/2011 | Gietzold | H02P 9/02 307/75 |
| 2015/0138685 A1* | 5/2015 | Gu | H02H 7/22 361/170 |

FOREIGN PATENT DOCUMENTS

| | | |
|---|---|---|
| CN | 1142570 C | 3/2004 |
| CN | 1589516 A | 3/2005 |
| CN | 201146161 Y | 11/2008 |
| CN | 201570856 U | 9/2010 |
| CN | 101924344 A | 12/2010 |
| CN | 201733079 U | 2/2011 |
| CN | 201781272 U | 3/2011 |
| EP | 0226704 A1 | 7/1987 |
| WO | 2009/090143 A1 | 7/2009 |

OTHER PUBLICATIONS

Search Report contained in the Office Action dated Aug. 31, 2015, issued by the State Intellectual Property Office of the People's Republic of China in corresponding Chinese Patent Application No. 201210241583.8, with English translation (3 pages).
Second Office Action dated Apr. 1, 2016 in corresponding Chinese application No. 2012102415818 (w/translation) (16 pages).
Extended European Search Report dated Jul. 5, 2016 in corresponding European application No. 13816548.5 (8 pages).
International Search Report issued in PCT/CN2013/079120, dated Sep. 19, 2013 (4 pages).

* cited by examiner

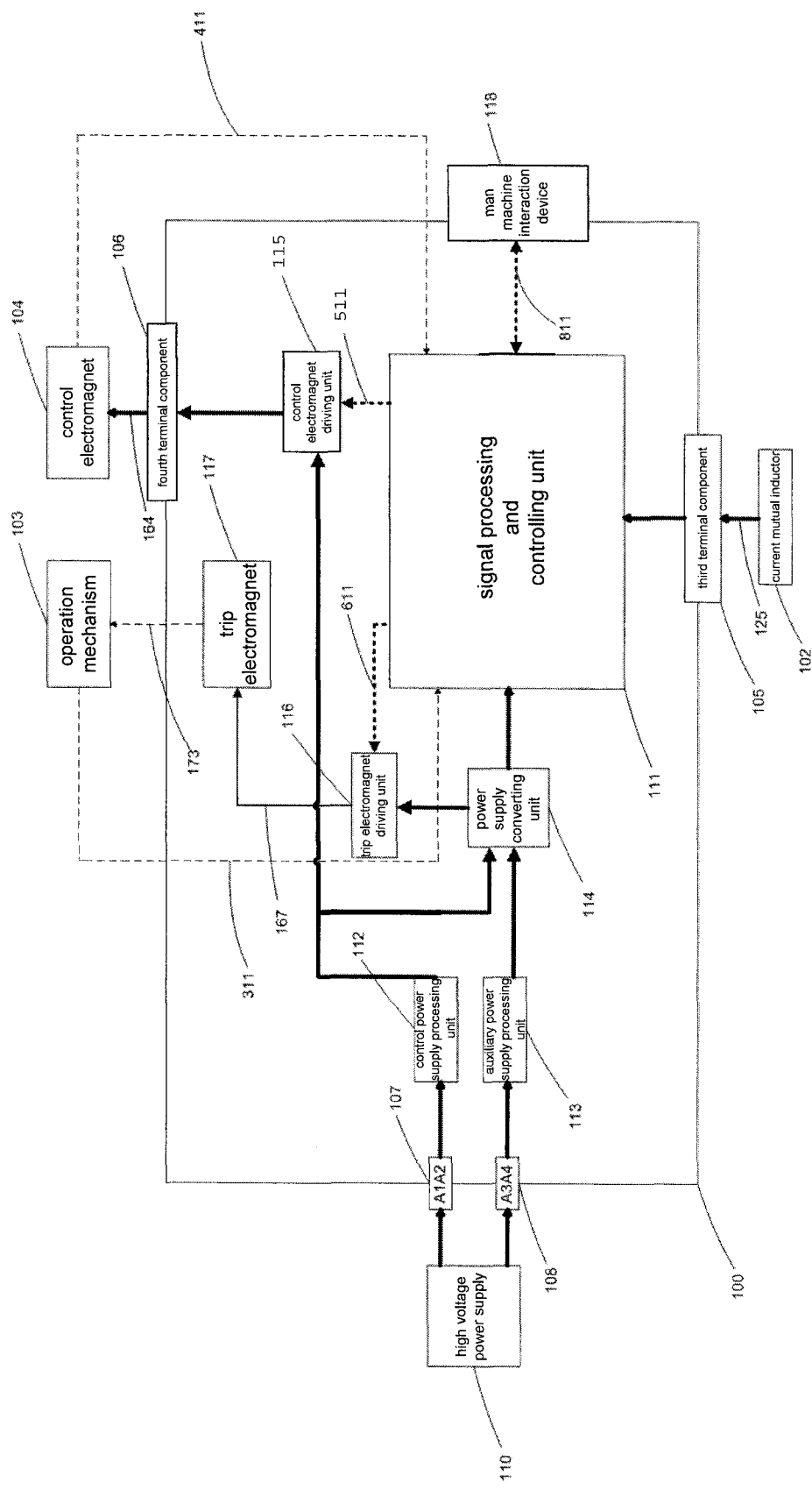

PROTECTION MODULE FOR CONTROL AND PROTECTIVE SWITCHING DEVICE

BACKGROUND OF THE INVENTION

1. Field of the Invention

The present invention relates to low voltage electrical apparatus, and more particularly, to a protection module for control and protective switching device.

2. The Related Art

A control and protective switching device is a switching device that can be automatically controlled or manually controlled, and has or does not have a local manual operation apparatus. A control and protective switching device can switch on, bear or break a current under a normal condition, including a current under a specified overload condition. A control and protective switching device can also switch on, bear within a specified time and break a current under an abnormal condition, such as a short circuit current. That is, a control and protective switching device integrates the functions of a breaker, a contactor and a thermal relay.

A control and protective switching device is generally consisted of a protection module/circuit and electrical apparatuses that are electrically connected to the protection module/circuit. The electrical apparatuses include housings, contact arc extinguishing systems, operation mechanisms, control electromagnets, trip electromagnets, mutual inductors and electronic component boards, etc.

Currently, the "Schneider Tesys U" series control and protective switching devices have three types: Multifunctional type, Advanced type and Basic type. Only the protection module of the Multifunctional type has a control power supply loop and an auxiliary power supply loop, and the additional functions, such as the communication function can be achieved only when the control power supply loop and the auxiliary power supply loop are connected simultaneously. The protection modules of the Advanced type and Basic type only have a control power supply loop. A protection module having only a control power supply loop has the following disadvantages: when a load that starts frequently is accessed to the control and protective switching device, frequent on-off of the control power supply results in frequent on-off of the circuit units within the protection module, which will cause considerable current impact injury to the circuit units, especially to chips, Field Effect Transistors (FETs), and capacitors. The service lives of the elements are thus influenced and the service life of the control and protective switching device is decreased.

Further, the protection module of some control and protective switching device uses a structure that the control power supply and the auxiliary power supply are independent, that is, the control power supply and the auxiliary power supply each has a pair of connection terminals. When the auxiliary power supply works under normal working voltage, a user may connect a control button externally and control the status of the control power supply through manipulation of the control button, so as to achieve the control of an electromagnet. The disadvantage of this design is that the user must connect the control power supply and the auxiliary power supply simultaneously so as to achieve normal work of switch device, which to some extent increases the complexity of usage and the workload of connection.

SUMMARY

The present invention provides a novel protection module for control and protective switching device.

According to an embodiment of the present invention, a protection module for control and protective switching device is provided. The protection module comprises a control power supply processing unit, an auxiliary power supply processing unit, a power supply converting unit, a signal processing and controlling unit, a trip electromagnet driving unit, a control electromagnet driving unit, and a man-machine interaction device.

The control power supply processing unit receives a high voltage power supply signal from a high voltage power supply and outputs a processed power supply signal. The control power supply processing unit supplies power for the control electromagnet driving unit via the processed power supply signal. The auxiliary power supply processing unit receives the high voltage power supply from the high voltage power supply and outputs the processed power supply signal. The power supply converting unit connects to the control power supply processing unit and the auxiliary power supply processing unit. The power supply converting unit converts the processed power supply signal outputted by the control power supply processing unit and the auxiliary power supply processing unit and supplies power for the signal processing and controlling unit and the trip electromagnet driving unit via the converted power supply signal. The signal processing and controlling unit receives a mutual-induction signal from a current mutual inductor, outputs a first control signal to the trip electromagnet driving unit, and outputs a second control signal to the control electromagnet driving unit. The signal processing and controlling unit also receives a first feedback signal from an operation mechanism and receives a second feedback signal from the control electromagnet. The trip electromagnet driving unit outputs a first operation signal to a trip electromagnet, which outputs a mechanical signal to the operation mechanism. The control electromagnet driving unit outputs a second operation signal to a control electromagnet. The man-machine interaction device performs signal interaction with the signal processing and controlling unit.

In one embodiment, the control power supply processing unit connects to the high voltage power supply through a first terminal component and receives a power supply signal from the high voltage power supply. The auxiliary power supply processing unit connects to the high voltage power supply through a second terminal component and receives a power supply signal from the high voltage power supply. The first terminal component connects to a control contact, which controls the outputting status of the high voltage power supply that is outputted to the first terminal component, and the second terminal component directly connects to the high voltage power supply. Or the first terminal component connects to a control contact, which controls the outputting status of the high voltage power supply that is outputted to the first terminal component, and the second terminal component is idle.

In one embodiment, the signal processing and controlling unit receives a mutual-induction signal from the current mutual inductor through a third terminal component. The third terminal component and the current mutual inductor are plugged into each other.

In one embodiment, the trip electromagnet is disposed within the protection module.

In one embodiment, the first feedback signal outputted by the operation mechanism to the signal processing and controlling unit is a mechanical signal, and the second feedback signal outputted by the control electromagnet to the signal processing and controlling unit is a mechanical signal.

In one embodiment, the control electromagnet driving unit outputs the second operation signal to the control electromagnet through a fourth terminal component.

In one embodiment, circuit parameters of the signal processing and controlling unit are adjusted so as to modify the primary loop rated current level of the protection module.

The protection module for control and protective switching device according to the present invention has flexible external connection manners, and has high reliability and desirable interchangeability. The protection module is safe, reliable and flexible when used within a control and protective switching device.

BRIEF DESCRIPTION OF THE DRAWINGS

The above and other features, natures, and advantages of the invention will be apparent by the following description of the embodiments incorporating the drawings, wherein, FIG. 1 illustrates the structure of a protection module for control and protective switching device according to an embodiment of the present invention.

DETAILED DESCRIPTION OF EMBODIMENTS

The present invention would like to provide a protection module for control and protective switching device, for which it is not necessary to connect to the control power supply and the auxiliary power supply respectively. The protection module can achieve all functions of the switching device under normal working condition by only connecting the control power supply, such that the complexity of usage and the workload of connection are decreased.

In order to achieve the above purpose, the present invention provides a solution as follows: a control and protective switching device consisted of a protection module and a based connected to the protection module. The base includes a housing, a pedestal, operation mechanisms, control electromagnets, and current mutual inductors. The pedestal is provided with separable moving and static contacts, and conductors bearing primary loop currents. The protection module is consisted of the following components: an electronic component board comprising a control power supply processing unit, an auxiliary power supply processing unit, a power supply converting unit, a signal processing and controlling unit, a control electromagnet driving unit, a trip electromagnet driving unit, a trip electromagnet, and a man-machine interaction device. The control power supply processing unit supplies power for the control electromagnet driving unit, and supplies power for the signal processing and controlling unit and the trip electromagnet driving unit through the power supply converting unit. The external terminal corresponding to the control power supply processing unit is A1A2. The auxiliary power supply processing unit only supplies power for the signal processing and controlling unit and the trip electromagnet driving unit through the power supply converting unit. The external terminal corresponding to the control power supply processing unit is A3A4.

Therefore, the protection module can provide two ways of external connection:

1) The A1A2 terminal connects to an external control contact, for example, the A1A2 terminal connects to an external control button. The voltage of the power supply is controlled through manipulation of the control button. The A3A4 terminal directly connects to the high voltage power supply.

2) The A1A2 terminal connects to an external control contact, for example, the A1A2 terminal connects to an external control button. The voltage of the power supply is controlled through manipulation of the control button. The A3A4 terminal is idle.

The first manner is adapted to the condition when a load that starts frequently is accessed to the control and protective switching device. The second connection manner can save a group of wiring, and is adapted to the condition when a load that does not start frequently is accessed to the control and protective switching device. The trip electromagnet responds to the signals generated by the signal processing and controlling unit, and actuates the operation mechanism in the pedestal by a mechanical actuator to separate the moving contact and the static contact. The protection module can detect a mechanical feedback signal returned by the control electromagnet and perform a corresponding control operation. The protection module may be connected to a base in an interchangeable, pluggable and modularized manner.

FIG. 1 illustrates the structure of a protection module for control and protective switching device according to an embodiment of the present invention. As shown in FIG. 1, the protection module 100 for control and protective switching device comprises: a control power supply processing unit 112, an auxiliary power supply processing unit 113, a power supply converting unit 114, a signal processing and controlling unit 111, a trip electromagnet driving unit 116, a control electromagnet driving unit 115, and a man-machine interaction device 118.

The control power supply processing unit 112 receives a high voltage power supply signal from a high voltage power supply 110 and outputs a processed power supply signal. The control power supply processing unit 112 supplies power for the control electromagnet driving unit 115 via the processed power supply signal. According to the embodiment shown in FIG. 1, the control power supply processing unit 112 connects to the high voltage power supply 110 through a first terminal component 107, and receives a power supply signal from the high voltage power supply 110. The auxiliary power supply processing unit 113 receives a high voltage power supply signal from the high voltage power supply 110 and outputs the processed power supply signal. According to the embodiment shown in FIG. 1, the auxiliary power supply processing unit 113 connects to the high voltage power supply 110 through a second terminal component 108 and receives a power supply signal from the high voltage power supply. According to one embodiment, the connection manner of the first terminal component and the second terminal component is configured to be one of the following two manners: 1) the first terminal component 107 connects to a control contact, which controls the outputting status of the high voltage power supply 110 that is outputted to the first terminal component 107, while the second terminal component 108 directly connects to the high voltage power supply 110. 2) The first terminal component 107 connects to a control contact, which controls the outputting status of the high voltage power supply 110 that is outputted to the first terminal component 107, while the second terminal component 108 is idle.

The power supply converting unit 114 connects to the control power supply processing unit 112 and the auxiliary power supply processing unit 113. The power supply converting unit 114 converts the processed power supply signal outputted by the control power supply processing unit 112 and the auxiliary power supply processing unit 113, and supplies power for the signal processing and controlling unit 111 and the trip electromagnet driving unit 116 via the converted power supply signal.

The signal processing and controlling unit 111 receives a mutual-induction signal from a current mutual inductor 102. According to the embodiment shown in FIG. 1, the signal processing and controlling unit 111 receives a mutual-induction signal from the current mutual inductor 102 through a third terminal component 105. The third terminal component 105 and the current mutual inductor 102 are plugged into each other. The signal processing and controlling unit 111 outputs a first control signal 611 to the trip electromagnet driving unit 116, and outputs a second control signal 511 to the control electromagnet driving unit 115. The signal processing and controlling unit 111 also receives a first feedback signal 311 from an operation mechanism 103, and receives a second feedback signal 411 from a control electromagnet 104. According to the embodiment shown in FIG. 1, both the first feedback signal outputted by the operation mechanism 103 to the signal processing and controlling unit 111 and the second feedback signal outputted by the control electromagnet 104 to the signal processing and controlling unit 111 are mechanical signals. According to an embodiment, circuit parameters of the signal processing and controlling unit 111 may be adjusted so as to modify the primary loop rated current level of the protection module 100.

The trip electromagnet driving unit 116 receives a first control signal 611 from the signal processing and controlling unit 111 and outputs a first operation signal 167 to a trip electromagnet 117. The trip electromagnet 117 outputs a mechanical signal 173 to the operation mechanism 103. According to one embodiment, the trip electromagnet 117 is disposed within the protection module 100.

The control electromagnet driving unit 115 receives a second control signal 511 from the signal processing and controlling unit 111 and outputs a second operation signal 164 to the control electromagnet 104. According to one embodiment, the control electromagnet driving unit 115 outputs the second operation signal 164 to the control electromagnet 104 through a fourth terminal component 106.

The man-machine interaction device 118 performs signal interaction with the signal processing and controlling unit 111.

The working principle of the protection module for control and protective switching device shown in FIG. 1 is as follows:

The high voltage power supply 110 outputs a high voltage power supply signal to the control power supply processing unit 112 through the first terminal component 107. The first terminal component 107 is also denoted as A1A2 in the drawings. The high voltage power supply 110 also outputs a high voltage power supply signal to the auxiliary power supply processing unit 113 through the second terminal component 108. The second terminal component 108 is also denoted as A3A4 in the drawings. The control power supply processing unit 112 outputs the processed power supply signal to the control electromagnet driving unit 115, and outputs the converted power supply signal to the signal processing and controlling unit 111 and the trip electromagnet driving unit 116 through the power supply converting unit 114. The auxiliary power supply processing unit 113 outputs the converted power supply signal to the signal processing and controlling unit 111 and the trip electromagnet driving unit 116 through the power supply converting unit 114. The signal processing and controlling unit 111 connects to the current mutual inductor 102 through the third terminal component 105, and receives a signal 125 from the current mutual inductor 102. The signal processing and controlling unit 111 outputs a first control signal 611 to the trip electromagnet driving unit 116. The trip electromagnet driving unit 116 outputs a first operation signal 167 to the trip electromagnet 117, the first operation signal 167 is a power supply signal. The trip electromagnet 117 outputs a mechanical signal 173 to the operation mechanism 103. It is preferred that the trip electromagnet 117 is disposed within the protection module 100, such that unreliable connection between the protection module 100 and the trip electromagnet 117 is eliminated fundamentally. The status of the operation mechanism 103 is returned to the signal processing and controlling unit 111 in a mechanical manner, that is, in the manner of the first feedback signal 311 (a mechanical signal). The signal processing and controlling unit 111 outputs a second control signal 511 to the control electromagnet driving unit 115. The control electromagnet driving unit 115 outputs a second operation signal 164 to the control electromagnet 104 through the fourth terminal component 106. The second operation signal 164 is a power supply signal. The status of the control electromagnet 104 is returned to the signal processing and controlling unit 111 in a mechanical manner, that is, in the manner of the second feedback signal 411 (a mechanical signal). The signal processing and controlling unit 111 and the man-machine interaction device 118 perform signal interaction, for example, outputting a signal 811 to each other.

When the control and protective switching device is under normal working condition, the A1A2 and A3A4 terminal components have the following two manners of connection:

1) The first terminal component 107, that is, the A1A2 terminal, connects to an external control contact. For example, the A1A2 terminal connects to an external control button. The status of the high voltage power supply inputted into the protection module is controlled through manipulation of the control button. The second terminal component 108, that is, the A3A4 terminal, directly connects to the high voltage power supply.

2) The first terminal component 107, that is, the A1A2 terminal, connects to an external control contact. For example, the A1A2 terminal connects to an external control button. The status of the high voltage power supply inputted into the protection module is controlled through manipulation of the control button. The second terminal component 108, that is, the A3A4 terminal, is idle.

The second connection manner can save a group of wiring, and is adapted to the condition when a load that does not start frequently is accessed to the control and protective switching device. Further, under the second connection manner, all functions that may be achieved under the first connection manner can be achieved as well. The drawback of the prior products that some functions can not be achieved without connecting to an auxiliary power supply is overcome.

The signal processing and controlling unit 111 receives the signal 125 from the current mutual inductor 102 and processes the signal 125. Based on different signals, the signal processing and controlling unit 111 outputs corresponding control signals to the trip electromagnet driving unit 116, the control electromagnet driving unit 115, and the man-machine interaction device 118. When the signal processing and controlling unit 111 determines that the signal 125 has normal values, the signal controlling unit 111 outputs control signals for maintaining normal working status to the trip electromagnet driving unit 116 and the control electromagnet driving unit 115, and outputs relative information to the man-machine interaction device 118. When the signal processing and controlling unit 111 determines that the signal 125 has various abnormal values, it is determined that the primary loop at which the control and protective switching device locates has malfunctions, such as overload, overcurrent, open phase, short circuit etc,. The signal processing and controlling unit 111 outputs corresponding failure signals to the trip electromagnet driving unit 116 and the control electromagnet driving unit 115, causes the trip electromagnet 117 to trip and drive the operation mechanism 103 to operate. The control electromagnet 104 is then open to break the primary loop and protect the accessed load. The signal processing and controlling unit 111 also outputs relative information to the man-machine interaction device 118.

The signal processing and controlling unit 111 can receive the first feedback signal 311 from the operation mechanism 103 and the second feedback signal 411 from the control electromagnet 104. Both the first feedback signal 311 and the second feedback signal 411 are in mechanical manner Based on the feedback signals, the signal processing and controlling unit 111 determines the current status of the handle and the primary loop and achieves various control, protection and additional functions. The signal processing and controlling unit 111 can receive signals from the man-machine interaction device 118, and generates corresponding signals or takes internal configurations.

Further, by adjusting the internal circuit parameters of the signal processing and controlling unit 111, the protection module 100 may be adapted to the primary loop rated current level of the control and protective switching module. By plugging the third terminal component 105 and the current mutual inductor 102 into each other, the protection module may be connected to a base in an interchangeable, pluggable and modularized manner.

The protection module for control and protective switching device according to the present invention has flexible external connection manners, and has high reliability and desirable interchangeability. The protection module is safe, reliable and flexible when used within a control and protective switching device.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A protection module for control and protective switching device, comprising:
    a control power supply processing unit for receiving a high voltage power supply signal from a high voltage power supply and outputting a processed power supply signal, the control power supply processing unit supplying power for a control electromagnet driving unit via the processed power supply signal;
    an auxiliary power supply processing unit for receiving the high voltage power supply from the high voltage power supply and outputting the processed power supply signal;
    a power supply converting unit for connecting to the control power supply processing unit and the auxiliary power supply processing unit, the power supply converting unit converting the processed power supply signal outputted by the control power supply processing unit and the auxiliary power supply processing unit and supplying power for a signal processing and controlling unit and a trip electromagnet driving unit via the converted power supply signal;
    the signal processing and controlling unit for receiving a mutual-induction signal from a current mutual inductor, outputting a first control signal to the trip electromagnet driving unit, and outputting a second control signal to the control electromagnet driving unit, the signal processing and controlling unit also receiving a first feedback signal from an operation mechanism and receiving a second feedback signal from a control electromagnet;
    the trip electromagnet driving unit for outputting a first operation signal to a trip electromagnet, the trip electromagnet outputting a mechanical signal to the operation mechanism;
    the control electromagnet driving unit for outputting a second operation signal to the control electromagnet;
    a man-machine interaction device for performing signal interaction with the signal processing and controlling unit.

2. The protection module for control and protective switching device according to claim 1, wherein
    the control power supply processing unit connects to the high voltage power supply through a first terminal component and receives power supply signal from the high voltage power supply;
    the auxiliary power supply processing unit connects to the high voltage power supply through a second terminal component and receives power supply signal from the high voltage power supply.

3. The protection module for control and protective switching device according to claim 2, wherein the first terminal component and the second terminal component are connected as follows:
    the first terminal component connects to a control contact, the control contact controlling the outputting status of the high voltage power supply that is outputted to the first terminal component;
    the second terminal component directly connects to the high voltage power supply.

4. The protection module for control and protective switching device according to claim 2, wherein the first terminal component and the second terminal component are connected as follows:
    the first terminal component connects to a control contact, the control contact controlling the outputting status of the high voltage power supply that is outputted to the first terminal component;
    the second terminal component is idle.

5. The protection module for control and protective switching device according to claim 1, wherein
    the signal processing and controlling unit receives the mutual-induction signal from the current mutual inductor through a third terminal component.

6. The protection module for control and protective switching device according to claim 5, wherein
    the third terminal component and the current mutual inductor are plugged into each other.

7. The protection module for control and protective switching device according to claim 1, wherein
    the trip electromagnet is disposed within the protection module.

8. The protection module for control and protective switching device according to claim 1, wherein the first feedback signal outputted by the operation mechanism to the signal processing and controlling unit is a mechanical signal;
the second feedback signal outputted by the control electromagnet to the signal processing and controlling unit is a mechanical signal.

9. The protection module for control and protective switching device according to claim 1, wherein
the control electromagnet driving unit outputs a second operation signal to the control electromagnet through a fourth terminal component.

10. The protection module for control and protective switching device according to claim 1, wherein
circuit parameters of the signal processing and controlling unit are adjusted so as to modify a primary loop rated current level of the protection module.

* * * * *